United States Patent Office 3,529,346
Patented Sept. 22, 1970

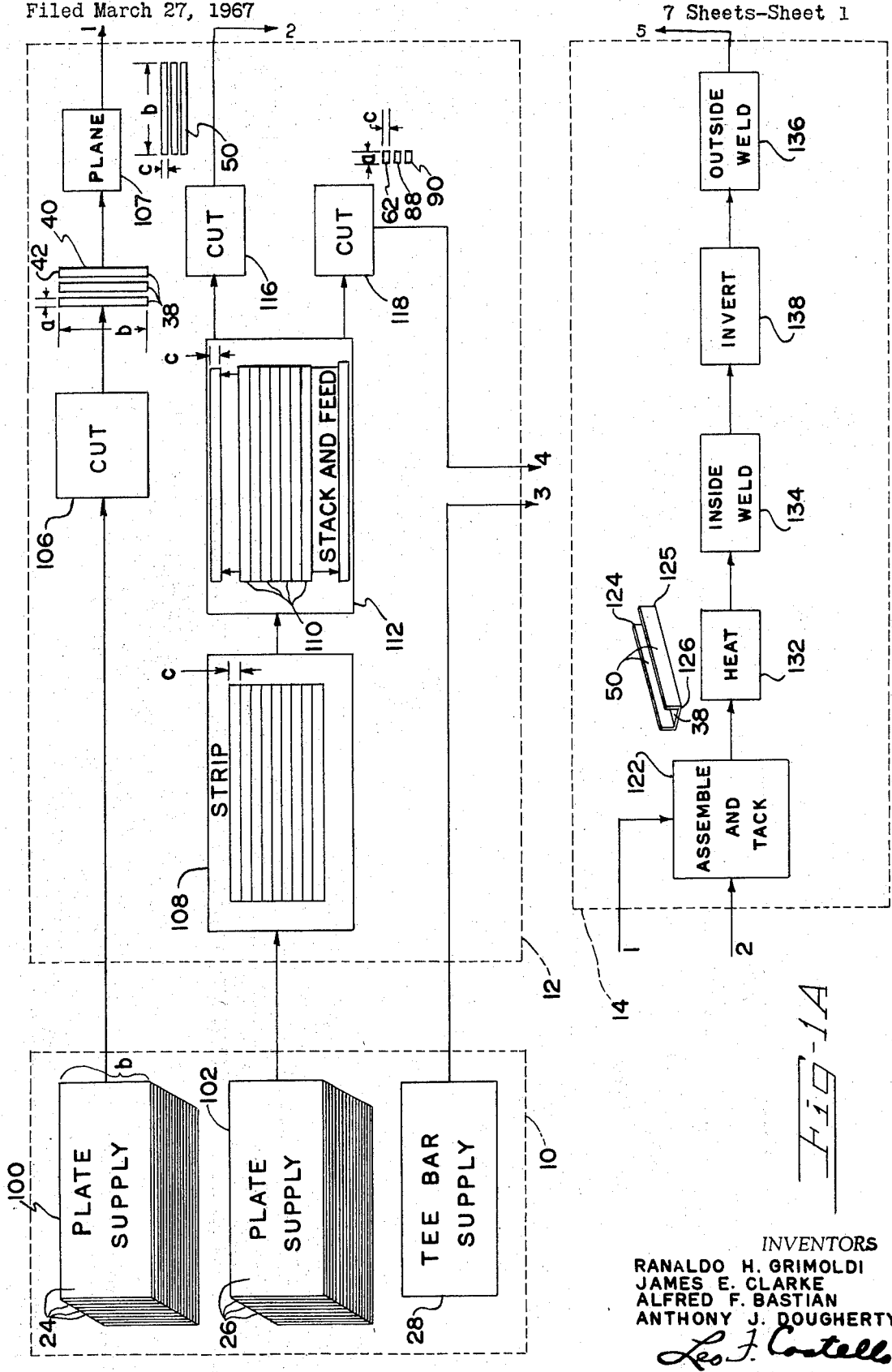

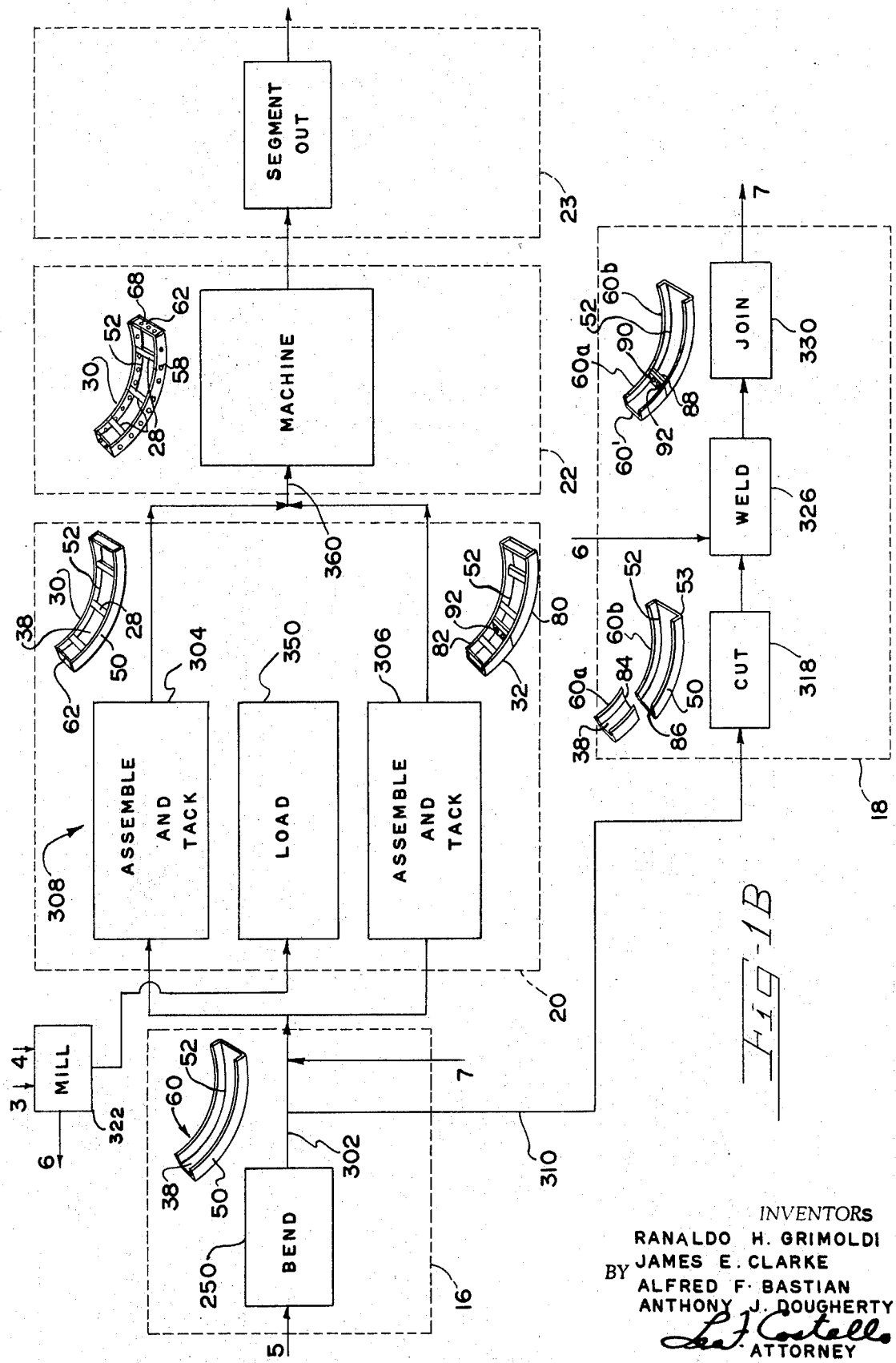

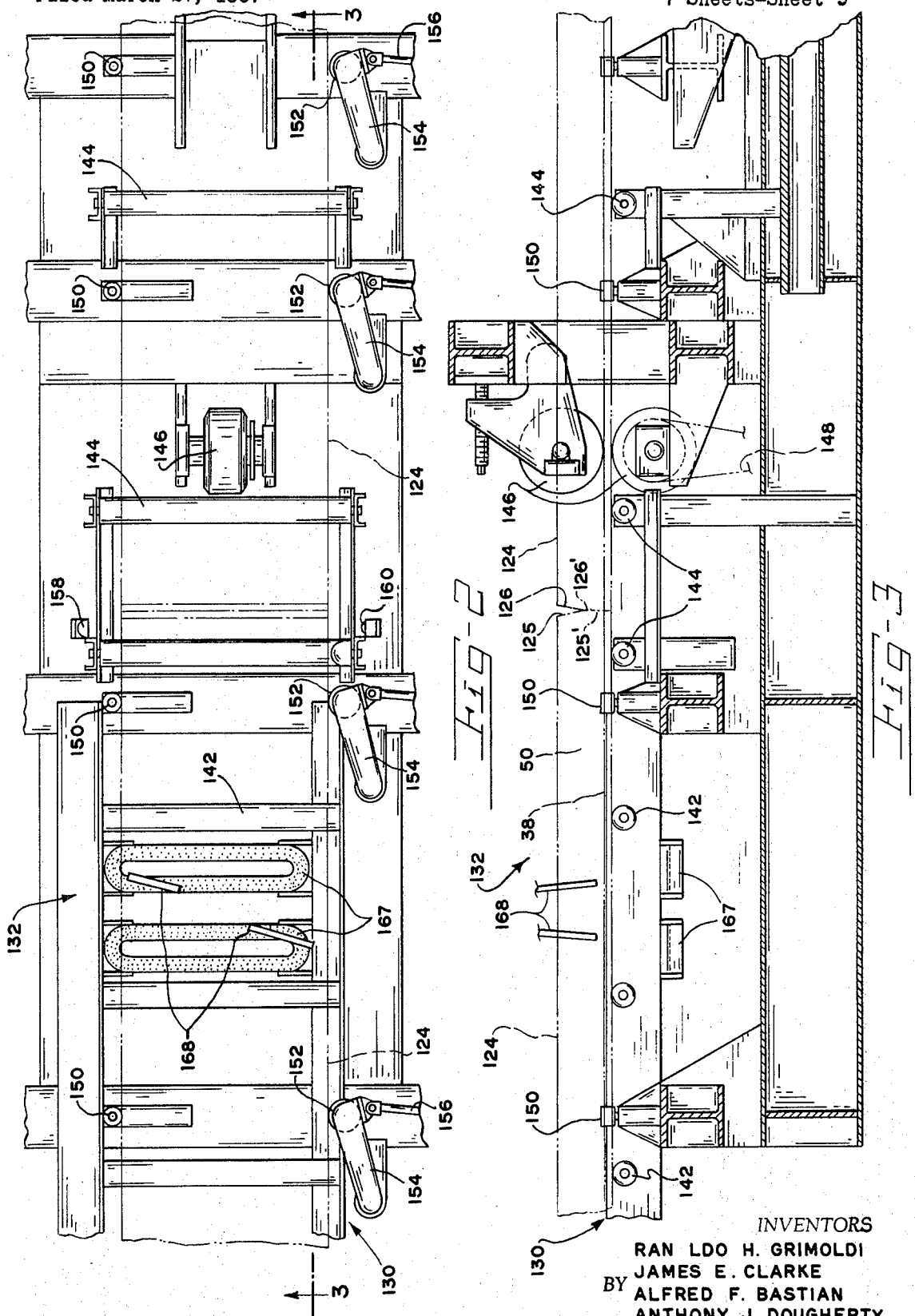

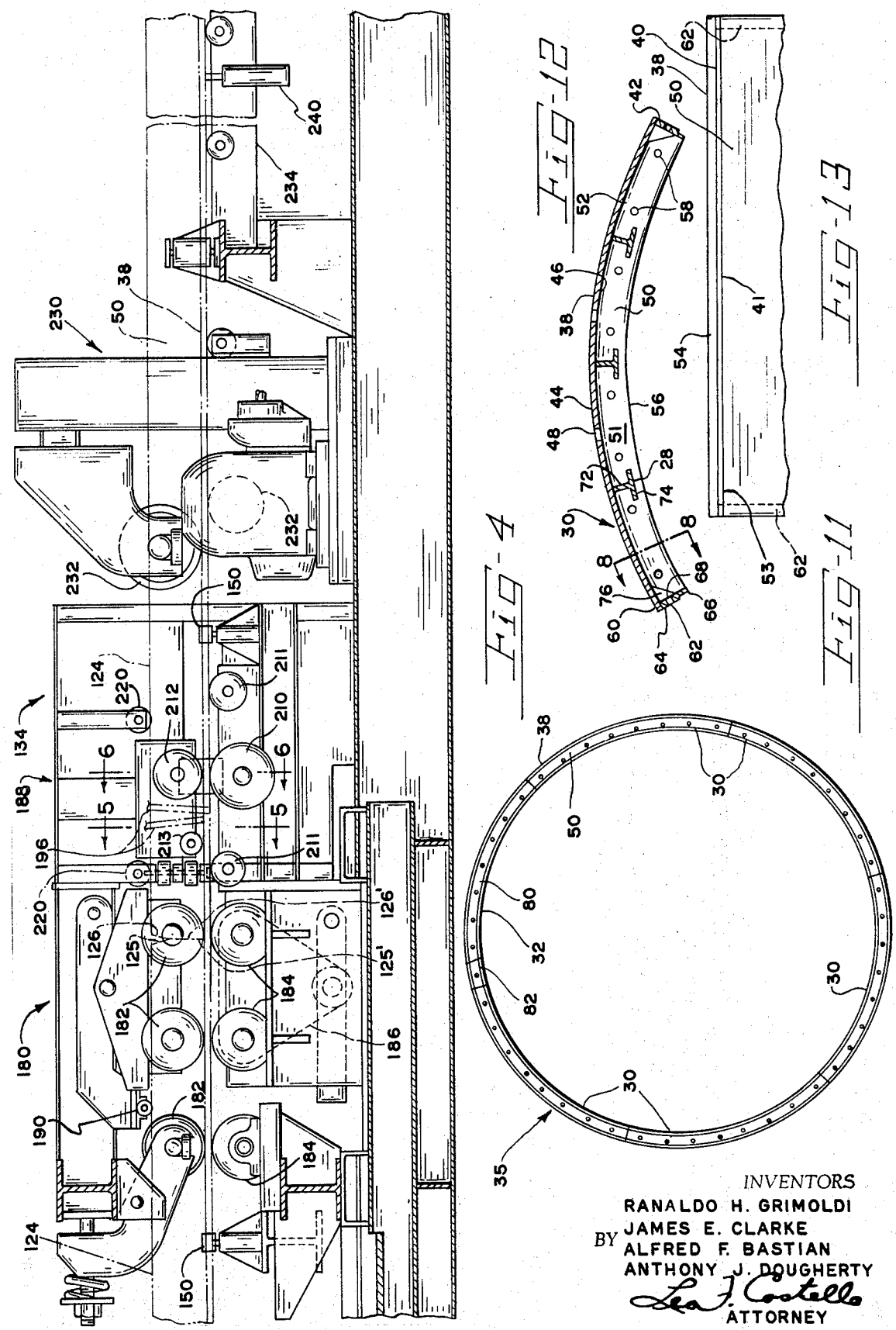

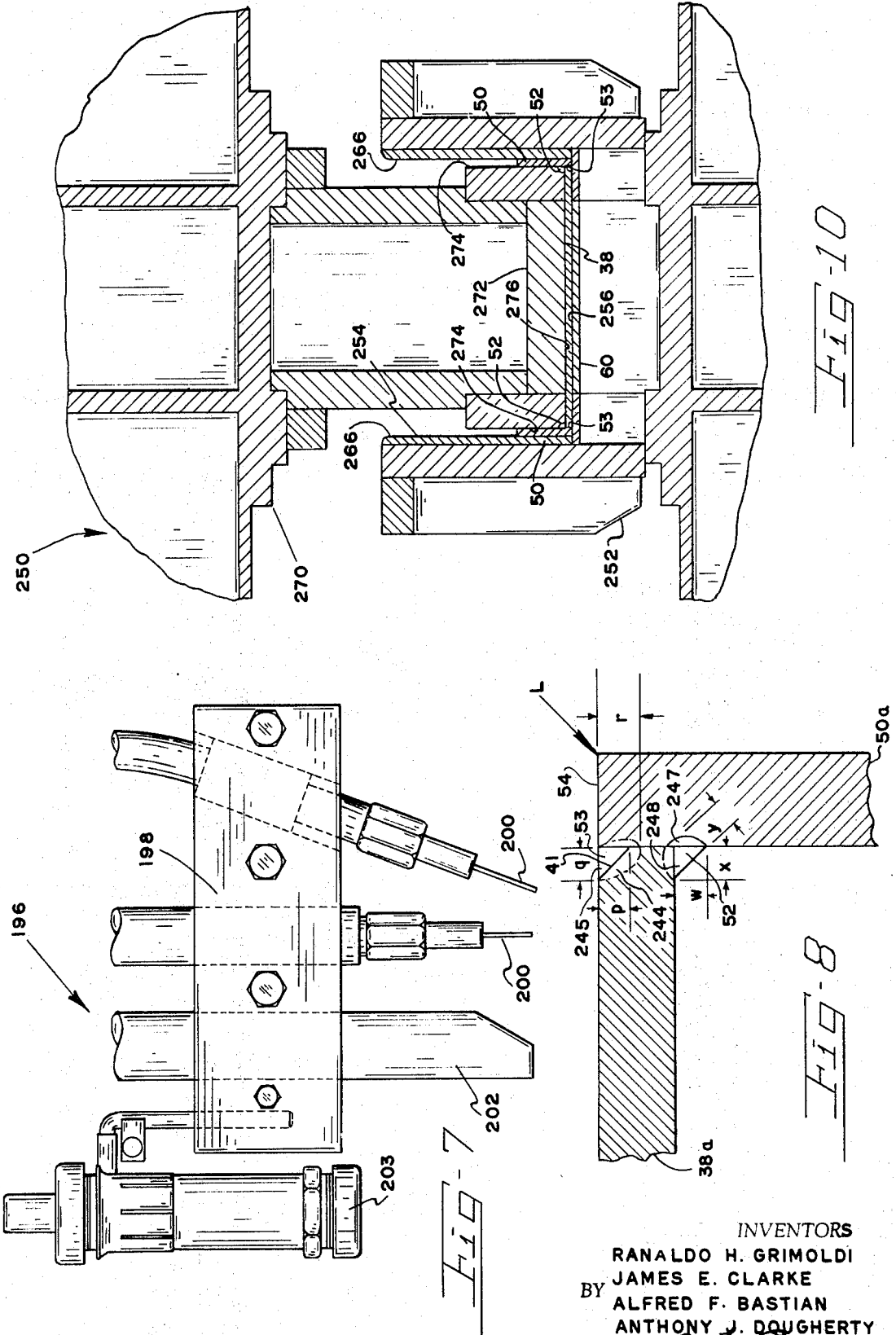

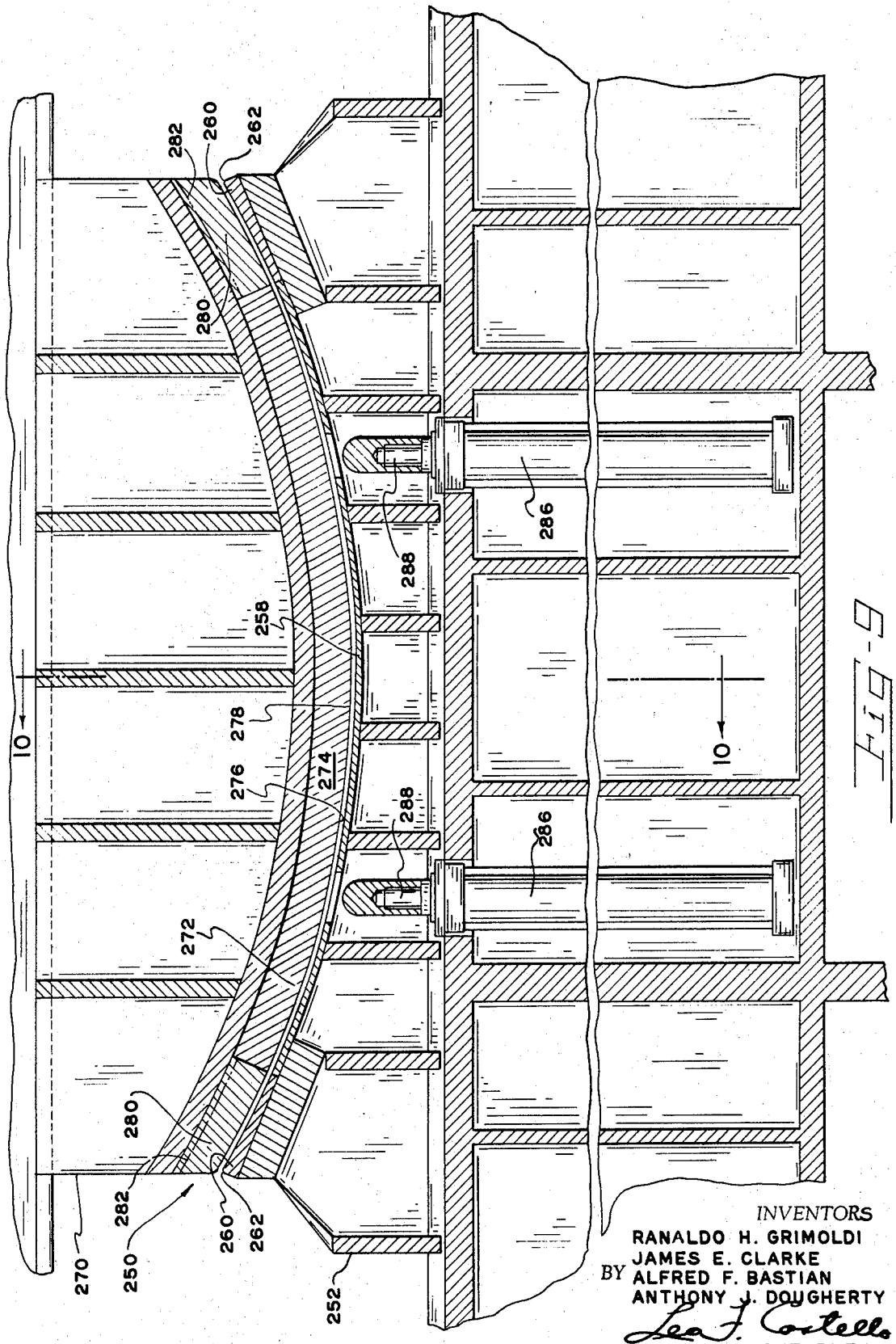

3,529,346
METHOD FOR MAKING CHANNEL STRUCTURE
Ranaldo H. Grimoldi, James E. Clarke, Alfred F. Bastian, and Anthony J. Dougherty, Napa, Calif., assignors to Kaiser Steel Corporation, Oakland, Calif., a corporation of Nevada
Filed Mar. 27, 1967, Ser. No. 626,121
Int. Cl. B23k 31/02
U.S. Cl. 29—475
19 Claims

ABSTRACT OF THE DISCLOSURE

A method for making a channel structure wherein separate flat pieces are secured together to form a straight channel, wherein the straight channel is bent, wherein reinforcing members are inserted in and attached to the bent channel thereby to form a modular unit whereby due to quality control, despite bending of the assembled parts, the final product has sound physical properties throughout. These results are obtained by carefully planning, organizing and controlling the manufacture of the channel structure in a system which takes advantage of mechanization as opposed to simple manual operations where such quality is impossible, or nearly so.

BACKGROUND OF THE INVENTION

The present invention pertains to a method for making channel structures and more particularly to a method for making tunnel ring segments and tunnel rings from such segments.

In the construction of subways, underground railways and roads, and other subterranean vehicular passageways, it has been known to line the hole bored in the earth with cylindrical rings connected end-to-end lengthwise of the tunnel, each ring being composed of a plurality of arcuate segments interconnected circumferentially of the tunnel axis.

With the present interest in rapid transit systems, a need exists for mass-producing tunnel ring segments on a large, rapid and economical scale in order to meet timetables set for installation of various systems throughout the world. However, previously known methods and apparatus are not suitable for making these channeled segments on a production line basis. For example, the Fine et al. Pat. 2,366,961 discloses a fixture into which each of several separate parts of a tunnel ring segment are manually inserted whereupon they are held in predetermined positions by the fixture and subsequently welded by a workman. Such a device is too slow and inaccurate when it is desired to mass-produce thousands of ring segments, each of which is the mirror image of the other, in a relatively short period of time.

SUMMARY OF THE INVENTION

The present invention pertains to making channeled structures, such as tunnel ring segments, on a production line basis. As contrasted with the one station concept of making a tunnel ring segment, as disclosed in the Fine patent, the concept of the present invention is to assemble, form, machine, or otherwise work on separate parts of the segments in a certain manner and at several predetermined areas or stations which are spaced from, yet fully integrated with, each other along a production line. More specifically, the subject invention contemplates coordinated production of both regular and wedge-type segments, subjecting both types of segments to certain common steps of the method, and subjecting only the wedge-type segments to other steps which are unique thereto. Segments which are of high radial and axial strength and which conserve metal without sacrificing strength are thereby produced. The subject method produces modular segments, that is, all the regular segments are entirely interchangeable with each other, and all the wedge segments are interchangeable with each other. Such interchangeability is enhanced because the errors and difficulties of interfitting prebent parts, as in Fine et al., are avoided in the subject invention. Thus, production is increased because it is unnecessary to produce the segments in groups or sets which must remain together for eventual assembly within a tunnel bore. By utilizing the concepts of the present invention, the segments can be transported in a standardized manner to the work site, being divided only into regular and wedge-type segments, where an appropriate number of regular and wedge segments may be indiscriminately selected for assembling into a tunnel ring using standard fittings and procedures.

Accordingly, it is an object of the present invention to provide a method for making channeled structures, such as tunnel ring segments, on a production line basis in order to rapidly and accurately produce high strength modular units while making relatively economical usage of labor and materials.

DESCRIPTION OF THE DRAWINGS

FIGS. 1A and 1B taken together are schematic views of a production line in which the method of the present invention is utilized, with the legend in each box indicating the general or main function performed thereat and with the sketches showing the condition of the elements of the segments at various places along the line.

FIG. 2 is a fragmentary horizontal section of a welding apparatus embodying certain principles of the present invention with the outline of a procession of channels being shown in dashed lines.

FIG. 3 is a fragmentary vertical section taken at a position indicated by line 3—3 in FIG. 2 with the outline of a procession of channels being illustrated in dashed lines.

FIG. 4 is a vertical section which shows a continuation of the welding apparatus illustrated in FIG. 3, with the outline of the channels being once again illustrated in dashed lines.

FIG. 7 is a somewhat enlarged fragmentary side elevation of a welding head as employed in the welding apparatus of FIG. 4.

FIG. 8 is a fragmentary sectional detail, taken at a position indicated by line 8—8 in FIG. 12, of a skin plate and side flange and particularly showing the inside and outside welds which join the skin plate to the side flanges to form the channel segment.

FIG. 9 is a fragmentary longitudinal section of a forming die incorporated as a part of the apparatus of the present invention.

FIG. 10 is a transverse vertical section taken on a plane at a position indicated by line 10—10 in FIG. 9 and with a channel being shown in the die.

FIG. 11 is an end view of a typical tunnel ring composed of the regular and wedge-type segments made by the method and apparatus of the present invention.

FIG. 12 is a longitudinal section through one of the regular segments of the tunnel ring of FIG. 11.

FIG. 13 is a fragmentary plan of the segment shown in FIG. 12.

DETAILED DESCRIPTION

Figure 6:
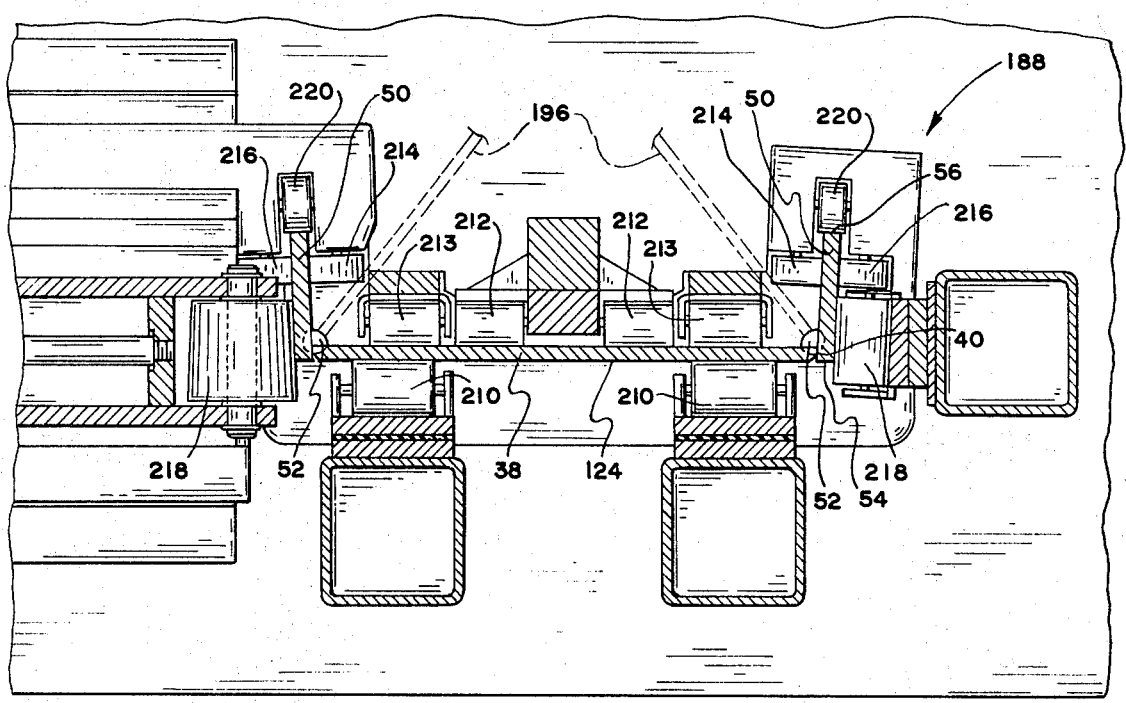
FIG. 6 is a somewhat enlarged transverse vertical section taken at a position indicated by line 6—6 in FIG. 4.

Referring more particularly to FIGS. 1A and 1B, the method of the present invention is carried out on a production line which, for purposes of convenient subsequent reference, is arbitrarily divided into a number of separate supply and work areas, namely, a supply area 10, a cutting area 12, a channel-forming area 14, a bending area 16, a wedge-forming area 18, a main assembly area 20, a machining area 22, and an output area 23. In general, flat stock plates 24 and 26 and T bars 28 are supplied to the production line from material supply area 10, and completed regular and wedge tunnel ring segments 30 and 32, respectively, are discharged from the line in the output area 23 where they are ready for assembly into a tunnel ring 35 (FIG. 11). In practice, the supply of T bars is not actually located in supply area 10 (FIG. 1A) but conceptually, it is convenient to indicate the major material inputs to the system in this one area.

Before describing the production line of FIGS. 1A and 1B in any greater detail, it is believed that a more detailed description of the segments 30 and 32 of each ring 35 would be helpful to a better understanding of the subject method and apparatus. Accordingly, with reference to FIGS. 1A, 1B, 8, 11, 12 and 13, the regular tunnel ring segment 30 includes an arcuate skin plate 38 having opposite side edges 40, opposite end edges 42, a convex outer surface 44, a concave inner surface 46, and a pair of grout holes 48. As used herein, "inner" and "outer" have reference to a radius from the inner surface 46 to the center of the arc of the segment. The regular segment also includes a pair of arcuate side flanges 50 having inside surfaces 51 and being welded by inside and outside welds 52 and 53 (FIG. 8) to the skin plate 38. The inside surfaces of the flanges individually abut the side edges 40 of the skin plate and their outer edges 54 are flush with the outer surface 44 of the skin plate. The side flanges project inward relative to the skin plate and have inner edges 56 spaced radially inward (relative to said radius) from the inner surface 46 of the skin plate. The side flanges also have a plurality of bolt holes 58 spaced lengthwise thereof. It is evident, therefore, that the skin plate and side flanges form an arcuate channel 60.

In addition, each regular segment 30 has end plates 62 respectively secured by welding within the channel 60 at opposite ends thereof. The end plates have outer edges 64 engaging the inner surface 46 of the skin plate, inner edges 66 coplanar with the inner edges 56 of the side flanges 50, and a plurality of spaced bolt holes 68. A plurality of the T bars 28 are welded within the channel 60, it being noted that the bars extend transversely of the channel and are generally equidistantly spaced lengthwise of the channel. Each T bar has a stem 72 which engages the inner surface 46 of the skin plate 38 as well as the inside surfaces 52 of the side flanges 50. Each T bar also has a flange 74 perpendicular to the stem, engaging the inside surfaces of the side flanges, and spaced radially outward from the inner edges 56 of the side flanges. For additional reinforcement, a plurality of gussets 76 are secured between the end plates 62 and the skin plate 38.

The wedge segment 32 is identical (FIG. 1B) to the regular segment 30 except that the wedge segment includes a main portion 80 and a wedge portion 82 which are releasably interconnected. The main and wedge portions having mating oblique edges 84 and 86 adjacent to which are secured (within the channel) mating intermediate plates 88 and 90, these plates being releasably connected by a plurality of bolts and associated nuts 92. Gussets may be provided between the intermediate plates and the skin plate of their respective portions.

Having completed the foregoing brief description of the segments 30 and 32, reference is again directed to FIGS. 1A and 1B. Stacks 100 and 102 of flat stock plates 24 and 26, respectively, and T bars 28 are delivered to the supply area 10 in any convenient manner. The stack 100 of plates 24 is for making skin plates 38, and the stack 102 of plates 26 is for making side flanges 50, end plates 62, and intermediate plates 88 and 90. The word "plate" in the metal arts and industries usually signifies metal of a certain thickness (as compared with "sheet" and "foil," for example); in the present description, however, such terms as "plate" and "sheet" do not imply metal of any thickness or range of thickness although as the subsequently described example will reveal, the present invention is excellently suited for use with both ferrous and nonferrous metal which is within the thickness range normally associated with the term "plate" in the steel industry. Of course, the plates used are of the dimensions and composition which are best suited for making the skin plates, side flanges, end plates and intermediate plates.

The stock plates 24 from the stack 100 are conveyed one-by-one to a skin plate cutter indicated at 106 (which may be a shear not shown) in which each plate 24 is cut transversely thereof into a plurality of skin plates 38 of predetermined width $a$, it being noted that the length of the skin plates is previously established by the dimension $b$ of the plates 24. After emerging from the cutter, the skin plates have their edges 40 beveled at 41 in a planning machine indicated at 107.

The stock plates 26 from the stack 102 are delivered one-by-one to a stripping apparatus indicated at 108 (which may be a gang of cutting torches not shown) for cutting each plate 26 lengthwise thereof into a plurality of strips 110, each having a width which corresponds to dimension $c$ of the side flanges 50 or the end plates 62. As a result of the torch cut, the lengthwise edges of the side flanges are uneven and dimension $c$ may vary somewhat among the various side flanges, a factor which must be taken into consideration in a subsequent step of the method as will be explained. The strips 110 are then placed on a stacking and feeding apparatus indicated at 112 which deposits the strips, one-by-one, in two paths respectively to a side flange cutter indicated at 116 (which may be a shear not shown) and to an end plate cutter indicated at 118 (which may be a circular saw not shown). The side flange cutter cuts the strips transversely thereof into a number of side flanges 50 of length $b$, whereas the end plate cutter cuts the strips delivered to it transversely thereof into a plurality of end plates 62 and intermediate plates 88 and 90 of dimension $a$, these plates already having dimension $c$ by virtue of the torch cut. The end and intermediate plates are sawed instead of sheared because their dimension $a$ must be maintained within close tolerances, as will be subsequently apparent.

Pairs of side flanges 50 and individual skin plates 38 are transferred from the planing apparatus 107 and from the cutter 116 to a channel-forming fixture indicated at 122 in the channel-forming area 14. In this fixture, a pair of side flanges are pressed against a skin plate with the opposite side edges 40 of the skin plate engaging the inside surfaces 52 of the side flanges thereby forming a straight channel 124 having its side flanges projecting upward and having forward and rear ends 125 and 126. Positioning the skin plate between the side flanges serves as a gage automatically controlling the width of the resulting segments 30, 32. While the skin plates and side flanges are maintained in this relationship in the fixture 122, short lengths of their edges at only the front end of the channel are tack-welded together.

Figure 5:
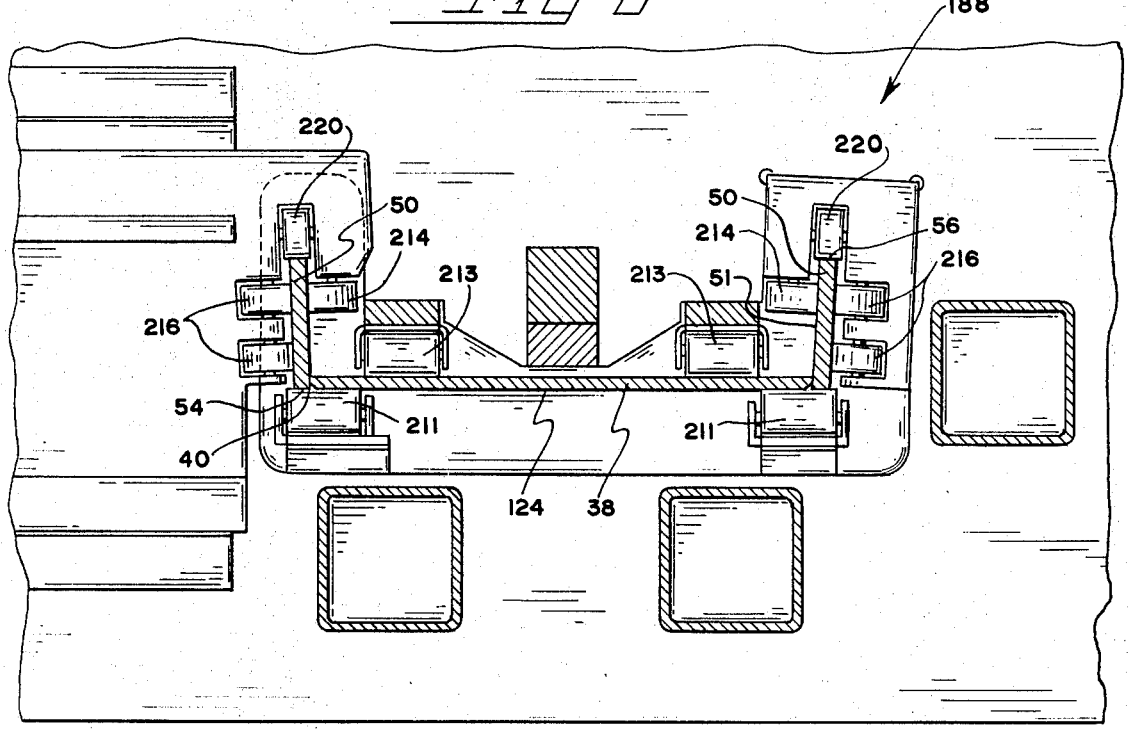
FIG. 5 is a somewhat enlarged transverse vertical section taken at a position indicated by line 5—5 in FIG. 4.

The straight channels 124 are ejected from the channel-forming fixture 122 onto a conveyor 130 (FIGS. 1A, 2, 3) on which they are moved past a preheating unit 132 and then through inside and outside welding units 134 and 136 and an inverter 138 between the welding units so as to precondition the same as noted more fully hereinafter. Because of the importance of securely joining the skin plate 38 and side flanges 50 of each channel together into channel-form, the heating and welding units are described in greater detail below. With reference to FIGS. 2, 3, 4 and 5–7 in particular, therefore, the conveyor includes a plurality of relatively small diameter, elongated horizontal rollers 142 and 144, a number of which are driven in order to move the channel 124 past the heating unit and toward the inside welding unit. Also provided are relatively large diameter, upper and lower horizontal rollers 146, the lower of which is driven by a linkage indicated at 148. Still further, a plurality of short vertical side rolls 150 are positioned in longitudinally spaced relation along one side of the conveyor, and a plurality of short vertical pressure rolls 152 are individually mounted on pivot arms 154 on the opposite side of the conveyor from the side rolls. Links 156 are connected to the arms for moving the pressure rolls toward and away from the side rolls in response to the application of power, such as fluid or electrical, to the links. A photoelectric cell 158 is mounted on one side of the conveyor, and a light 160 shines across the conveyor onto the cell so that when the light is interrupted by a channel 124 on the conveyor, the pressure rolls 152 rearward of the photoelectric cell are automatically moved in to shove the channel against the side rolls and thereby press the side flanges 50 tightly against the side edges 40 of the skin plate 38. As will be understood, the downwardly facing surface of the skin plate and the lower edges 54 of the side flanges 50 are maintained in a common plane since all of these edges ride on the horizontal rollers 142.

The heating unit 132 (FIGS. 2 and 3) includes a plurality of lower flame ejecting jets 166 and a pair of upper flame ejecting jets 168. As each channel 124 is conveyed through the heating unit on the conveyor 130, the lower jets direct flames upward onto the skin plate 38 and the upper jets direct flames respectively onto the side flanges 50. This raises the temperature of all of the channels to approximately the same elevated degree, irrespective of the ambient temperature, and preconditions the channels for welding by maintaining a better heat balance throughout the channel. By having the channel at a relatively high temperature when it is being welded, distortions in the channel due to warpage or shrinkage are minimized especially where the skin plate and side flanges are of different thicknesses and other dimensions and, therefore, have different heat capacities.

The large diameter upper and lower rollers 146 guide and drive the channels 124 into a preliminary section 180 (FIG. 4) of the inside welding unit 134. This preliminary section includes a plurality of upper plate rolls 182 and a plurality of lower plate rolls 184 between which the skin plate 38 of each channel passes and which maintain these skin plates in a horizontal plane. A drive mechanism 186 rotates the forward lower plate rolls in this preliminary section in order to drive the channels forward into a welding section 188 of the welding unit. Top flange rolls 190 in the preliminary section engage the upper edges of the side flanges 50 of the channels and maintain their lower edges against the lower plate rolls. The inside surfaces 51 of the side flanges are held tightly against the opposite side edges 40 of the skin plate by a series of side rolls 150 and pressure rolls 152, as in the heating unit 132. Suitable photoelectric means, not shown, is provided for energizing the pressure rolls in the preliminary section.

In the welding seection 188 (FIG. 4), welding heads 196 are mounted on brackets 198 (FIG. 7) which position their associated electrodes 200 and associated flux tubes 202 in closely adjacent relation to the two inside junctures between the skin plate 38 and side flanges 50 of each straight channel 124. Dual electrodes are used in each head to speed the welding operation and to form the weld in just one pass of the channel through each welder. It is very important that prior to, during, and just after the weld metal is deposited in the junctures between the skin plate and side flanges, the skin plate and side flanges be precisely positioned in a desired manner relative to each other and that this precise positioning be maintained without any relative movement occurring between the skin plate and side flanges at least while the weld metal is in a semifluid state. To this end, and with reference to FIGS. 4, 5 and 6, lower horizontal plate rolls 210, 211 support each skin plate in a horizontal plane, upper horizontal plate rolls 212, 213 press the skin plate downward against the lower plate rolls, upper inside and outside flange rolls 214 and 216 and lower outside flange rolls 218 position the side flanges in slight obtuse angular relationship with the skin plate and hold the side flanges tightly against the opposite side edges of the skin plate, and top flange rolls 220 engage the upper edges of the side flanges and maintain the lower edges of the side flanges coplanar with the lower surface of the skin plate. The lower flange rolls 218 (FIG. 6) on one side of the welding section are laterally movable and urged under pressure (electrical or fluid) against the adjacent side flange thereby to urge the entire channel against the opposite flange rolls whereby the side flanges are pressed tightly against the skin plate. Since the welding heads 196 are located between sets of upper and lower plate rolls, as is evident by reference to FIGS. 4, 5 and 6, the side flanges and skin plates are precluded from moving relative to each other while weld metal is being deposited in the inside junctures of the channel by the electrodes 200 and for a time following the deposit of metal, at least while said deposited metal is in a semifluid condition. The inside welding unit also includes an output section 230 having upper and lower plate rolls 232 and a conveyer 234 which carries the welded straight channels 124 out of the inside welding unit and onto the inverter 138.

Therefore, the welding unit of the present invention insures that the inside welds 52 between the skin plate 38 and side flanges 50 of each channel 124 are sound and devoid of deleterious porosity conditions and in good condition without any cracks that would weaken the otherwise uniform bond between the skin plate and side flanges.

Still another feature of the inside welding unit 134 is worthy of note. The channels 124 are fed into the inside welding unit on the conveyor 130 with the flat portions 125' at the front ends 125 of the skin plate 38 and the side flanges 50 of any given channel in contact with the flat portions 126' at the rear ends 126 of the skin plate and side flanges of the channel immediately ahead of such given channel, as illustrated in FIG. 3, and the opposite ends of each side flange and skin plate are cut and planed to enable such contact prior to entry into the channel-forming fixture 122. This contact is maintained all through the welding unit so that, insofar as the welding heads 196 are concerned, what is presented to them is one continuous length of channel with no gaps or interruptions therein. The purpose of this feature is to allow the welding electrodes to lay down a continuous line of weld material and thereby to avoid the pooling of weld material, minimize porosity and resultant foul-up and delay in production, if gaps were allowed to exist between adjacent channels. Of course, as a result of this feature, adjacent ends of adjacent channels emerging from the welding unit 134 are welded together. Accordingly, in the output section 230, each channel is temporarily lifted by a weld breaker 240 which, in effect, pivots each channel about its rear end 126 that is joined to the front end 125 of the channel therebehind in order to break the connection and free the channels from each other. Conveniently, the weld breaker is any mechanism for lifting the channel, such as a cylinder, power driven arm, or the like.

The channels 124 having their inside welds 52 completed are conveyed onto an inverter 138 where they are turned over so that their skin plates 38 face upward and their side flanges 50 project downward. In this condition, the channels are conveyed in end-to-end abutting relationship through the outside welding unit 136 which is, in principle, the same as the inside welding unit 134 except that the outside unit maintains the skin plate and side flanges of each channel, while inverted, in predetermined relatively immovable relationship as the outside welds 53 are being deposited. Because of the similarity between the inside and outside welding units, the outside welding unit is not described in detail.

As completed, the inside and outside welds 52 and 53 are generally as shown in FIG. 8. Each outside weld extends uniformly for the full length of the channel and is generally fractionally ellipsoidal in shape with an inner arcuate portion 244 penetrating both the skin plate and adjacent side flange and an outer triangular portion 245 in a groove provided for the purpose by bevel 41 between the skin plate and the side flange. The inside weld likewise extends the full length of the channel and is substantially semicylindrical with an inner arcuate portion 247 penetrating both the skin plate and adjacent side flange and an outer triangular portion 248 in the corner between the plate and flange. Although the inside and outside welds do not fully penetrate the skin plate and side flange, they nearly do, and could in fact, it being noted that the disclosed total penetration (i.e., the total amount of weld metal between inner and outer surfaces 44 and 46) is greater than one-half the thickness of the skin plate.

The straight channels 124 with their inside and outside welds 52 and 53 are conveyed to a forming die or press 250 (FIGS. 1B, 9 and 10) in the bending area 16. This die includes a stationary bed 252 having an arcuate recess 254, which is of U-shaped cross-section, as best seen in FIG. 10, and which has an arcuate bottom wall 256 including an intermediate portion 258, the surface of which constitutes a segment of a cylinder whose center or axis would lie above the die and off the paper in FIG. 9. The bottom wall also includes a pair of end portions 260 having a greater curvature than the intermediate portion, that is, curving upwardly slightly more abruptly than an exact continuation of the curvature of the intermediate portion. The end portions terminate in end edges 262, and the intermediate portion has a pair of openings 264 therein. The recess also has a pair of vertical side walls 266 extending perpendicularly upward from the bottom wall.

The forming die 250 also includes a movable head 270 which is mounted, in a manner not shown but well understood in the art, for vertical movement between a pressing position, illustrated in FIGS. 9 and 10, within the recess 254, and a retracted position, not shown, but withdrawn from the recess and spaced above the bed 252. The head has a lower end 272 including a pair of vertical side surfaces 274 interconnected by a longitudinally arcuate lower surface 276. The lower surface, like the bottom wall 256, includes an intermediate portion 278 having the same curvature as the intermediate portion 258 and a pair of end portions 280 having the same curvature as the end portions 260 of the bottom wall and being provided with shoulders 282. When the head 270 is disposed in its pressing position within the recess 254, the side surfaces 274 are in spaced parallel relation to the side walls 266, such spacing being essentially the thickness of each side flange 50.

Still further, this forming die 250 includes a pair of stripping cylinders 286 mounted within the bed 252 and having piston rods 288 projecting upward and movable through the opening 264. The rods move between stripping positions, not shown, above the bottom wall 256 and retracted positions (FIG. 9) withdrawn below the openings.

In carrying out the bending step of the subject method, each straight channel 124 having inside and outside welds 52 and 53 is positioned in the forming die 250 with the opposite ends of the skin plate 38 resting on the end edges 262 of the bed 252 and with the channel extending lengthwise and over the recess 254. Means, not shown, are provided for precluding movement of the channel lengthwise of the recess as it awaits descent of the head 270. Application of power to the forming die lowers the head into the channel, and the intermediate portion 278 of the lower surface 276 of the head engages the upwardly disposed surface of the skin plate 38 of the channel. It will be remembered that the side flanges 50 are welded to the skin plate 38 so that the side flanges diverge outward from the skin plate; such divergence insures unobstructed entry of the head into the channel. As the head continues down, the skin plate is bent into the shape of the bottom wall 256 of the bed and the lower surface of the head; the side flanges are bent lengthwise in their individual planes to the same curvature as the skin plate and transversely into right angular relation to the skin plate and are held to a uniform thickness notwithstanding the bending action. The opposite ends of the skin plate are bent to a greater degree of curvature than the intermediate portion of the skin plate, as would be expected in view of the relative curvatures of the end portions 260, 280 and the intermediate portions 258, 278. The shoulders 282 engage the side flanges to impart the same extra bending to the side flanges as to the skin plate. The reason for such overbending is that, when the bent channel is removed from the die, the ends of the channel tend to return toward a straight condition, because of the resilience of the metal. Therefore, by overbending, compensation is made for this return action so that after the occurrence of return bending, the end portions of the channel are of the same curvature as the intermediate portion.

It is noteworthy that the head 270 applies direct pressure only against the skin plate 38 of each channel 124 and does not apply bending pressure directly against the side flanges 50 except for said overbending at the end of the downward stroke of the head. In this manner greater accuracy in bending the channel to precise curvature is achieved. Because of unevenness and slight differences in widths of the side flanges, because of the torch cutting as above explained, the head 270 would not simultaneously engage the full extent of both side flanges and thus one side of the channel would be bent more than the other side if the head were allowed to engage not only the skin plate but also the side flanges throughout the bending stroke. Applying bending force directly only against the skin plate is highly satisfactory since the inside and outside welds 52 and 53 are actually stronger than the skin plate and side flanges so that application of direct bending pressure to the skin plate and not to the side flanges does not affect the integrity, or otherwise weaken, these welds. Therefore, the channels are uniformly bent to the precise curvature desired which, of course, facilitates both assembly of the channels with the end plates 62, T bars 28, and intermediate plates 88, 90 and the segments 30 and 32 in the tunnel rings 35.

The interdependence of the welding and bending steps is to be noted. Welding at the junctures is such as to enable bending in the manner described without deleteriously affecting the welds 52 and 53, and bending is effected after welding so that the skin plate 38 and side flanges 50 remain flat whereby welding is performed along straight instead of curved, paths.

Most of the arcuate channels 60 are moved by a main conveyor, indicated at 302, from the forming die 250 to the main assembly area 20 where they are alternately delivered to assembly stations 304 and 306 of an assembly apparatus 308, such as illustrated and described in copending application Ser. No. 626,111, of Joseph E. Powers et al., filed on Mar. 27, 1967. A certain number of the arcuate channels, however, are diverted onto an auxiliary conveyor, indicated at 310, and conveyed into the wedge forming area 18.

In the wedge forming area 18, each arcuate channel 60 is first cut into two parts 60a, 60b by a channel cutter indicated at 318 exposing oblique edges 84 and 86. As shown by the sketch of the channel near the box used to indicate this cutter, the arcuate channel is cut relatively adjacent to one end thereof in a plane which mades an obtuse angle with that portion of the skin plate 38 adjacent to the end at which the cut is made. These parts are then conveyed to a welding station 326.

Intermediate plates 88, 90 are transported from the cutter 118 (FIG. 1A) to a milling station 322 (FIG. 1B) and from there to the wedge forming area 18 at the welding station 326. Intermediate plates 88, 90 are welded inside each channel part 60a, 60b adjacent to each oblique edge 84 and 86. Thereafter, the exposed end faces of the intermediate plates 88, 90 on each part 60a, 60b are milled, holes are drilled in these intermediate plates, and the channel parts are rejoined at a subassembly station 330 by bolts 92 extended through the mating intermediate plates.

Each wedge-type arcuate channel 60' is conveyed back onto the main conveyor 302 where it is moved, along with the regular arcuate channels 60, to the assembly apparatus 308. Since both the regular and wedge-type channels are processed in exactly the same manner in the main assembly area 20, no distinction between the channels is made in the subsequent discussion of the assembly area. Thus, the channels are delivered to the assembly stations 304, 306 where they are individually supported with their concave surfaces facing upward. Supplies of T bars 28 and end plates 62 are delivered from the milling station 322 to a loading station 350 between the assembly stations where the bars and plates are oriented in a group (including in the disclosed embodiment, three T bars and two end plates) and in the same angular relationship as they will be in the channel. This group is then picked up, carried to one of the assembly stations, inserted as a group into the channel at that station, and pressed tightly against the skin plate. While one group of bars and plates is being carried to and inserted in one of the channels, a subsequent group is being prepared for delivery to a channel at the other assembly station. Servicing of two assembly stations from one loading station thus increases the production rate.

After a group of end plates 62 and T bars 28 are properly located within a channel 60, 60' at an assembly station 304, 306, this group is held in the channel, and each end plate and T bar is welded (preferably only tack-welded) in position. At this point it is to be noted that the end plates are sawed in the cutter 118 in order to achieve a precise length whereby the end plates fit within close tolerances between the side flanges 50 of each channel. The T bars are likewise cut to exact lengths. The assembled segments 30, 32 are released from each assembly station after the plates and bars have been at least tack-welded to their channel, and the segments are discharged onto an output conveyor indicated at 360. This output conveyor moves the segments through the final welding and machining area 22 where each of the T bars and end plates is securely welded to its channel, where the bolt holes 68 are drilled in the side flanges and end plates, where the grout holes 48 are drilled in the skin plate 38 of each segment, and where the side flanges and end plates are milled as desired for proper fitting against corresponding parts in the ring 35 and tunnel liner, not shown, formed by the rings. The finished segments 30 and 32 are then conveyed into the output area 23 where they are stockpiled for shipment to the site of the tunnel, not shown. There a number (five herein) of regular segments 30 and a single wedge segment 32 are bolted together to form the tunnel ring, and a series of tunnel rings are bolted together to form a tunnel liner within a hole bored in the earth.

Although the invention is not so limited, it may facilitate an understanding of the invention to set forth certain specific details regarding certain tunnel ring segments 30, or 32, actually made by the method and apparatus of the present invention. Thus, for a tunnel ring having an inside diameter of seventeen feet and an outside diameter of eighteen feet, each segment 30 or 32 is about 9½ feet long by about 1½ feet wide. The end and intermediate plates 62, 88 and 90 and the side flanges 50 of these segments are made of $13/16$ inch steel plate, and the skin plate for such segments is made of $9/16$-inch steel plate.

The steel used includes structural grades of shapes and plates and specifically, the side flanges, end and intermediate plates, and the T bars are made of A441 (ASTM) and the skin plates are made of A36 (ASTM) but could also be made of A441. The weld metal is of about the same composition as A36 and the dimension of the inside welds 52 (see FIG. 8) are: $w$—¼ inch, $x$—¼ inch, and $y$—5/16 inch minimum; and for the outside weld: $p$—¼ inch, $q$—¼ inch, and $r$—⅜ inch minimum. These specifications produce inside and outside welds that are sound, relatively free of porosity conditions and stronger than the skin plate and side flanges such that in a load test, not shown nor specifically described herein, when a structure such as shown in FIG. 8 is supported with the edges 38a and 50a on a surface and load is applied as indicated at L, the skin plate and side flanges will bend before the welds will break.

From the foregoing, it will be evident that a method has been provided for making tunnel ring segments, or the like, on a production line or continuous process basis. As opposed to the one-station concept of the prior art, the method of the present invention makes various parts of the segment, both individual elements and subassemblies, in a certain manner and at certain positions in the production line and then brings all these individual parts and subassemblies together in a main assembly area where final assembly into a segment is completed. The individual steps of the production process are so arranged and performed that segments of high strength and precise dimensions flow smoothly from station to station and are produced at a rapid rate. Furthermore, the subject method is capable of coordinated production of both regular and wedge-type segments by subjecting only the wedge-type segments to certain steps which are unique thereto and subjecting both type segments to certain common steps. The precision by which the subject segments are made is evidenced by the fact that all of the regular type segments produced are entirely interchangeable so that any five, for example, can be connected together in forming a ring; this same feature of interchangeability is true of the wedge-type segments.

Although an embodiment of the present invention has been shown and described, it will be understood that various changes and modifications may be made in the details thereof without departing from the spirit and scope of the appended claims wherein:

What is claimed is:

1. A method for making channeled structures that have uniform physical properties throughout on a production line which has an input and an output comprising the steps of forming channels at a first area relatively adjacent to the input of the production line so that the channels have substantially straight central and side portions and a joint between each side portion and said central portion, conveying the straight channels in a generally straight line procession along the production line toward a bending area, bending each channel at the bending area without deleteriously affecting the joints between side and central portions so that all of the channels have the same curvature, conveying the bent channels in a procession away from the bending area and along said production line, inserting a reinforcing member in a predetermined position in each channel at an assembly area, fastening the inserted reinforcing member in its respective channel thereby to provide reinforced arcuate channels, and conveying the reinforced channels in a procession along the production line away from the assembly area and toward said output.

2. The method of claim 1 wherein said production line has a main path and an auxiliary path, conveying a number of the bent channels from the main path, at a point in advance of said assembly area, along said auxiliary path, dividing each channel in the auxiliary path into two parts, releasably fastening said parts together to form a plurality of wedge type channels, returning said wedge type channels to said main path in advance of the assembly area so that said wedge type channels join the procession of channels advancing toward said assembly area.

3. A method of making a channeled structure on a production line having an input and output spaced from the input, comprising the steps of forming a channel at a first area relatively adjacent to the input of the production line so that the channel has substantially straight central and side portions, conveying the straight channel to a second area on the line, bending the channel at the second area so that the channel has a smooth curvature with its central portion having an arcuately longitudinally extending concave surface between said side portions, conveying the bent channel to a third area on the production line, inserting a reinforcing member into the channel at said third area so that said member is in contact with said concave surface of the central portion and with said side portions, and fastening said reinforcing member to said channel, said channel-forming step including welding straight flat side flanges to opposite side edges of a straight flat skin plate.

4. A method of making a reinforced channel which is composed of a planar skin plate, a pair of planar side flanges each having substantially straight side edges, a pair of end plates and a T bar, all of which are initially separate from each other, comprising the steps of attaching the straight side edges of the side flanges respectively to opposite side edges of the skin plate so that the skin plate and the side flanges form a straight channel having opposite ends and a substantially straight joint between each side flange and the skin plate, applying force against said skin plate between said side flanges while initially supporting said channel only at its opposite ends in a die of predetermined curvature thereby to bend the skin plate, the joints and the side flanges lengthwise thereof until all of said skin plate and the adjacent edges of the side flanges bottom against said die, inserting the T bar into the channel, and attaching the end plates to opposite ends of the channel.

5. The method of claim 4 including the step of inserting the end plates into the channel between the side flanges thereof before attaching said end plates to the channel.

6. The method of claim 4 including the step of inserting the end plates, as well as the T bar, into the channel with the T bar spaced between the end plates and with the T bar and end plates contacting the side flanges and the skin plate, and wherein said attaching steps include welding the side flanges to the skin plate and the T bar and end plates to the skin plate and the side flanges.

7. In a method of mass-producing reinforced channels, each of which is composed of a skin plate, a pair of side flanges, and a reinforcing member, the steps of cutting a plurality of rectangular skin plates from a piece of metal at a first station, cutting a plurality of rectangular strips from a piece of metal at a second station spaced from but adjacent to said first station, cutting said strips transversely thereof into a plurality of rectangular side flanges and reinforcing members adjacent to said second station, moving said skin plates and side flanges to a channel-forming area, attaching a pair of said side flanges to each skin plate at said forming area thereby forming a plurality of straight channels, conveying said straight channels to a bending area, bending each of said straight channels at said bending area into an arcuate shape without deleteriously affecting the joints between side flanges and skin plate, moving the reinforcing members from said second station to an assembly area, conveying said bent channels to the assembly area, inserting at least one reinforcing member in each bent channel at the assembly area, and connecting the reinforcing member to its channel.

8. In a method for mass-producing tunnel ring segments, each of which has uniform physical properties throughout and which includes a skin plate, a pair of side flanges, a pair of end plates, and a T bar, the steps of assembling a pair of side flanges and a skin plate with the opposite side edges of the skin plate engaging the side surfaces of the flanges so that the skin plate serves to maintain the side flanges in predetermined spaced relation to each other thereby to form a straight channel having front and rear ends, securing the skin plate and side flanges together thereby to preclude movement of the plate and flanges lengthwise relatively to each other, conveying the secured straight channel along a substantially horizontal path while applying weld metal in continuous lines along the junctures of the channel between the skin plate and the side flanges so that the weld metal penetrates into the side flanges and the skin plate, constraining the side flanges and skin plate to move along predetermined paths during and following said metal-applying step in order to preclude relative movement between the side flanges and skin plate and thereby to prevent cracking of the welds along said junctures, bending the straight channel into an arcuate channel following application and hardening of said weld metal, inserting said end plates and T bar into said bent channel, and attaching said end plates and T bar to said channel.

9. A method for mass producing tunnel rings each of which includes a skin plate, a pair of side flanges, a pair of end plates and a plurality of T bars comprising the steps of cutting a first rectangular plate of steel transversely thereof into a plurality of rectangular skin plates of predetermined thickness, cutting a second rectangular plate of steel lengthwise thereof into rectangular strips of thickness greater than said predetermined thickness, cutting said strips transversely thereof into a plurality of rectangular side flanges and end plates, assembling a pair of side flanges and a skin plate with the opposite side edges of the skin plate maintaining the side flanges in predetermined spaced relation to each other thereby to form a straight channel having front and rear ends, tack-welding the skin plate and side flanges together, conveying the tack-welded channel along a substantially horizontal path through a welding area while applying weld metal in continuous lines along inside and outside junctures of the channel between the skin plate and the side flanges, precluding movement of the side flanges relative to the skin plate while said weld metal is semi-fluid to prevent cracking of the welds along said junctures, applying force against said skin plate between said side flanges while initially supporting said channel only at its opposite ends in a die of predetermined curvature thereby to bend the skin plate, welded junctures and side flanges lengthwise thereof until all of said skin plate and the adjacent edges of the side flanges bottom against said die, inserting a plurality of T bars into the arcuate channel in longitudinally spaced relation therealong with opposite ends of the stems and flanges of the T bars abutting the side flanges and with the flanges of the T bars displaced from the exposed edges of the side flanges, inserting end plates into opposite ends of the channel between and in contact with said skin plate and side flanges, pressing the stems of the T bars and the adjacent edges of the end plates firmly against the surface of the skin plate, and welding the T bars and end plates to the channel.

10. A method of making a metal channel of predetermined shape which channel includes a pair of side members joined by a central member, comprising the steps of providing separate rectangular metallic planar central and side members, assembling said members into a straight channel, securing said members together by forming a continuous weld along the junctures between each side member and the central member, precluding movement of said members relative to each other while forming said welds thereby to insure the integrity of said welds, said channel remaining substantially straight following said securing step, and bending the channel out of said straight condition by supporting said channel on said central member and only at its opposite ends with the side members projecting up from the central member and by applying downward force to the central member between the side members to bend the central member lengthwise thereof into nonplanar condition and said side flanges lengthwise and in the planes thereof without breaking said welds.

11. The method of claim 10 wherein said forming step includes forming welds along the inside of the junctures within the channel and along the outside of the junctures outside of the channel.

12. The method of claim 11 wherein said securing step effects penetration of said inside and outside welds into said members so that the total depth of penetration of both inside and outside welds is more than half the thickness of the central member whereby the penetrated portions of the welds are contiguous.

13. The method of claim 12 wherein said bending step is effected without initially applying bending force directly against said side members but causing them to bend by allowing the bending force to be transmitted to the side members from the central member through the welds.

14. A method of making a metal channel of predetermined shape which channel includes a pair of side members joined by a central member, comprising the steps of providing separate rectangular metallic planar central and side members, assembling said members into a straight channel thereby forming a juncture between each side member and the central member, securing said members together by forming a continuous weld along the junctures between each side member and the central member, precluding movement of said members relative to each other while forming said welds thereby to insure the integrity of said welds, said channel remaining substantially straight following said securing step, and bending the channel out of said straight condition by bending said central member lengthwise thereof into nonplanar condition and said side flanges lengthwise and in the planes thereof without breaking said welds, said attaching step including the steps of positioning the side members against the central member with said side members in spaced parallel relation to each other, tack welding the side members to the central member thereby forming said straight channel, heating said straight channel so that the entire channel is at approximately the same predetermined elevated temperature, and welding the side members to the central member along the junctures therebetween after said heating step.

15. A method of making a metal channel of predetermined shape which channel includes a pair of side members joined by a central member, comprising the steps of providing separate rectangular metallic planar central and side members, assembling said members into a straight channel thereby forming a juncture between each side member and the central member, securing said members together by forming a continuous weld along the junctures between each side member and the central member, precluding movement of said members relative to each other while forming said welds thereby to insure the integrity of said welds, said channel remaining substantially straight following said securing step, and bending the channel out of said straight condition by bending said central member lengthwise thereof into nonplanar condition and said side flanges lengthwise and in the planes thereof without breaking said welds, said attaching step including the steps of preliminarily fastening the side members to the central member so that the side members are in spaced parallel relation to each other and a straight channel is formed, and conveying said preliminarily fastened straight channel lengthwise thereof along a substantially rectilinear path so that the junctures between said central member and side members travel past welding electrodes thereby forming welds along said junctures, said precluding step involving constraining each side member and said central member to travel along predetermined paths adjacent and fixed relative to said electrodes so that the said members cannot move relative to each other.

16. The method of claim 15 including the step of directing heat against said straight channel as it travels along said rectilinear path toward said electrodes.

17. A method of continuously making a plurality of metal channels on a production line basis comprising the steps of providing separate rectangular metallic planar central and side members, preparing opposite ends of the members with flat portions, assembling pairs of side members with individual central members into straight channels, conveying said straight channels along a substantially horizontal path with said channels in alignment and with the flat portions of the front end of each channel tightly contacting the flat portions of the rear end of the channel forwardly adjacent thereto, the side and central members of the channels being respectively aligned and defining continuous gap-free junctures which extend lengthwise of the plurality of channels, forming a continuous weld along each juncture while said channels are being conveyed whereby the side members of each channel are firmly secured to their respective central member and whereby said contacting ends of adjacent channels are interconnected, and breaking the connection between the ends of adjacent channels following the formation of said weld.

18. In a method of making a ring which is composed of a plurality of arcuate regular segments and a single arcuate wedge segment, the steps of making a plurality of identical arcuate channels at a first area, each channel so made including a pair of spaced parallel side flanges connected to and projecting from a skin plate, conveying most of said channels from said first area to a second area, conveying a predetermined number of said channels from said first area to a third area spaced from said second area, cutting each channel in said third area obliquely of the length thereof to divide the same into a wedge portion and an auxiliary portion, attaching intermediate plates to the wedge and auxiliary portions adjacent to the obliquely cut ends thereof, mating! and releasably connecting the mated intermediate plates of each divided channel in order to form wedge channels, conveying said wedge channels to said second area, and inserting reinforcing members in, and attaching said members to, all the channels at said second area to form a plurality of said regular and wedge segments whereby a predetermined number of regular segments and a single wedge segment can be fitted together in a ring.

19. A method for making channeled structures on a production line comprising the steps of forming channels at a first area so that the channels have a substantially straight central and side portion and a joint between each side portion and said central portion, conveying the channels away from the first area in a procession along the production line toward a bending area, bending each channel at the bending area without deleteriously affecting the joints between side and central portions and so that all of the channels have substantially the same curvature, conveying the bent channels in a procession away from the bending area and along said production line to an assembly area, inserting a reinforcing member in a predetermined position in each channel at the assembly area, fastening the inserted reinforcing member in its respective channel thereby to provide reinforced arcuate channels, and conveying the reinforced channels in a procession along the production line away from the assembly area.

(References on following page)

References Cited

UNITED STATES PATENTS

| | | | |
|---|---|---|---|
| 1,923,008 | 8/1933 | Proctor | 29—155 |
| 2,684,528 | 7/1954 | Rossheim | 29—480 |
| 3,164,713 | 1/1965 | Banks | 219—124 |
| 3,268,985 | 8/1966 | Smith | 29—429 |

FOREIGN PATENTS 156,912 Russia.

JOHN F. CAMPBELL, Primary Examiner

R. J. CRAIG, Assistant Examiner

U.S. Cl. X.R.

29—155, 429, 471.1